June 6, 1972  A. O. DOUGLASS ET AL  3,667,855

PORTABLE DRILL GUIDE

Filed Sept. 29, 1970  2 Sheets-Sheet 1

INVENTORS.
ALLAN O. DOUGLASS
ROBERT F. DOUGLASS

INVENTORS.
ALLAN O. DOUGLASS
ROBERT F. DOUGLASS

United States Patent Office 3,667,855
Patented June 6, 1972

3,667,855
PORTABLE DRILL GUIDE
Allan O. Douglass, 5635 Kansas Ave. 68110, and Robert F. Douglass, 5708 Willit St. 68152, both of Omaha, Nebr.
Filed Sept. 29, 1970, Ser. No. 76,469
Int. Cl. B23b *45/14*
U.S. Cl. 408—114        6 Claims

ABSTRACT OF THE DISCLOSURE

A portable drill guide comprising attachment means adapted to be anchored to a work-piece and on which a hand lever control rack and pinion is mounted, an elongated frame means attached to the outer end of the rack bar in a manner for the adjustable positioning of the frame means so that a far end thereof can be fixed in a position closer or farther from the rack bar and so that the frame means can be positioned anywhere in a plane at a right angle to the rack bar, the far end of the frame means rotatably supporting and guiding a power drill assembly.

FIELD OF THE INVENTION

This invention is in the field of drill guides which are adapted to be transported to the work-piece itself, as is desirable when the work-piece is heavy and difficult to move to a conventional drill press.

DESCRIPTION OF THE PRIOR ART

One drill press proposed in the prior art could be considered portable inasmuch as it was designed to clamp onto the edge of a work bench and thereby could be transported from one place to another with easier disconnection than would otherwise be the case. However, it is desirable to be able to anchor a body portion of the drill press to a work-piece of the large and bulky type by means of bolts extending into the work-piece in tapped holes for firmly mounting the drill press.

SUMMARY OF THE INVENTION

A portable drill guide comprising a shaft to one end of which a power drill may be attached and on the other end of which a drill bit holder is attached, an elongated frame means rotatably carrying the shaft, a rack bar parallel to the shaft, a body member having means thereon for attaching it to a work-piece and slidably receiving the rack bar, a lever and pinion assembly mounted on the body for moving the rack bar in directions parallel to the shaft, and clamping means which can be manually clamped and unclamped for clamping the frame means to an outer end of the rack bar in positions for the positioning of the shaft at various positions closer or farther from the rack bar and in various positions in a plane at a right angle to the rack bar.

DESCRIPTION OF THE PREFERRED EMBODIMENT

Figures 1, 2:
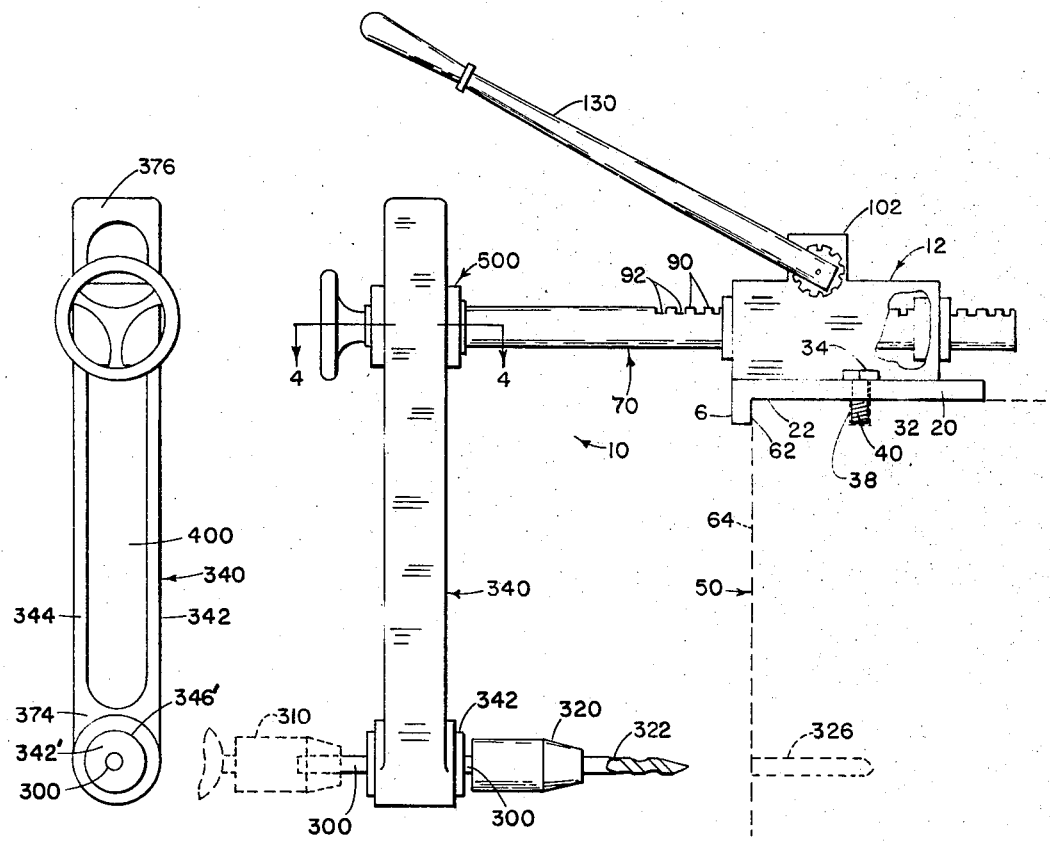
FIG. 1 is a side elevation of the portable drill guide of this invention shown in a position fastened to a work-piece, the latter shown in dotted lines, a power drill used with the drill guide also being shown in dotted lines.
FIG. 2 is a left-hand elevation of that portion of the drill guide which includes a clamping assembly and an elongated frame means.
Figure 3:
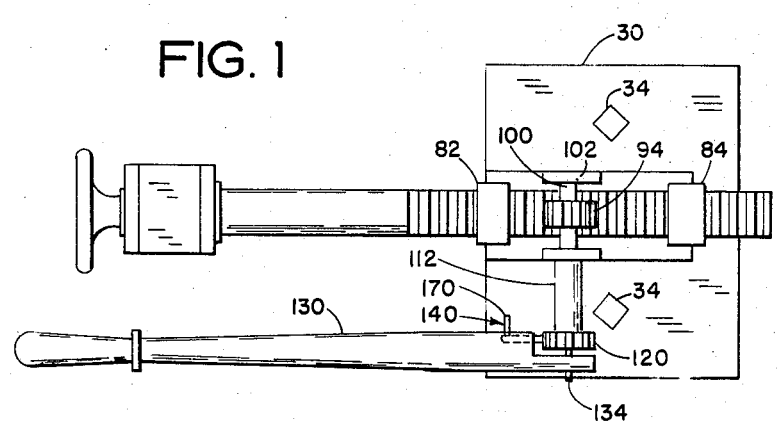
FIG. 3 is a top plan view of the parts shown in FIG. 1 but without portions of the power drill and work-piece.

The portable drill guide of this invention is generally indicated at 10 in FIG. 1 and comprises a body member 12 having on it attachment means 20 having a planar exterior surface 22 which is the underside of a plate 30 which extends horizontally in the position shown in FIGS. 1 and 3, the the plate 30 having openings 32 therethrough for receiving bolts 34 which threadedly attach the plate 30 to the threaded wall 38 of each of a plurality of drilled recesses 40 in a work-piece generally indicated in dotted lines at 50. Along one edge of the plate 30 is a downwardly extending flange 60 having a surface 62 disposed in a plane at a right angle to the planar undersurface 22 of the plate 30 so that the downwardly extending surface 62 of the transverse flange 60 can engage a vertical surface 64 of the work-piece 50 at times when the undersurface 22 engages the upper surface of the work-piece 50.

The plate 30 is integral with the body 12. The body 12 has two bearings 82 and 84 attached to it and the rack bar 70 can also be called a directing member 70 and extends slidably through the bearings 82 and 84.

The rack bar 70 is preferably in the form of a shaft having a cylindrical exterior throughout its length as a matter of general outline but having a plurality of longitudinally spaced transverse teeth 90 on its side facing away from the plate 30, the teeth 90 being disposed between grooves 92 cut in the cylindrical material of which the rack bar or elongated directing member 70 is made.

The purpose of the teeth 90 is to receive the teeth of a pinion 94 which is itself mounted on an axide 100 rotatably carried by gears 102 projecting upwardly from the side of the body member which is opposite the plate 30.

The axle 100 has an enlarged outer portion 112 extending beyond the gears 102 and to the latter a ratchet wheel 120 is attached.

A rotation control lever 130 is rotatably attached to an outermost portion 134 of the axle 100 and rotates thereon in a plane at a right angle to the axle portion 134 and the lever 114 has a conventional reversible pawl mechanism generally indicated at 140 mounted thereon and controlled by an adjustment trigger 170.

When the adjustment trigger 170 is placed in different ones of two separate positions, the pawl mechanism 140 will reverse its action.

For example, when the lever 114 is swung in one direction about the axle 100, the pawl mechanism will be in engagement with the ratchet wheel 120 and the axle 100 will be rotated in the said one direction. Conversely, upon swinging the lever 130 in an opposite direction, the pawl mechanism 140 will release the ratchet wheel 120 with the trigger still in the first position.

With the trigger in a second position and the rotation of the lever 130 in a second direction, the ratchet wheel and axle 100 will be rotated similarly, but the swinging of the lever in the opposite direction will not rotate the axle 100.

In operation, it will be seen that the lever 130 and pawl mechanism 140 can, therefore, be used to move the rack bar or directing member 70 in either direction longitudinally of itself.

The drill guide further comprises a shaft 300 on one end of which a power drill generally indicated at 310 may be attached, and on the other end of the shaft 300, which is the end closest to the body member 12, a drill bit holder or drill chuck 320 is mounted for supporting a drill bit 322 so that it can be used to drill a bore 326 in the work-piece 50.

An elongated frame means is generally indicated at 340 and has a bearing 342' mounted in an aperture 346' in it so that the shaft 300 which is rotatably carried in the bearing 342' is disposed at a right angle to the elongation of the frame means 340.

The frame means 340 has two spaced side portions 342 and 344, which latter are disposed in parallelism with each other, each having an innermost surface 346 and 348 respectively, each of which face the opposite side portion 342 or 344.

Figure 4:
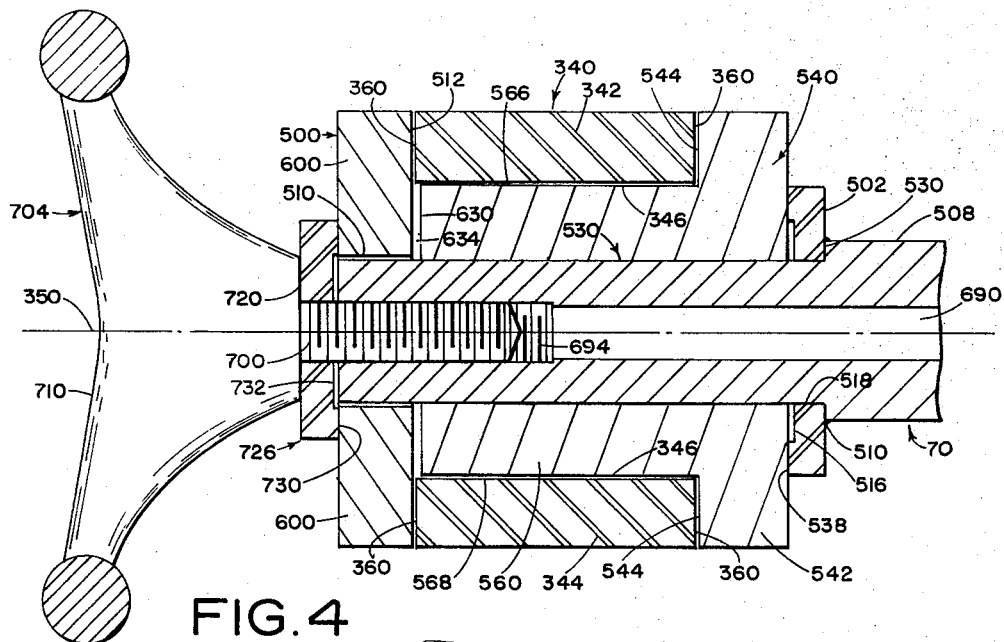
FIG. 4 is a sectional view taken along the line 4—4 of FIG. 1.

The innermost surfaces 346 and 348 are in parallelism with each other and also in parallelism with an axis 350 which extends longitudinally through the rack bar or directing member 70, as best seen in FIG. 4.

Each side portion further has a pair of parallel edge surfaces 360, which latter are disposed at a right angle to the axis 350, and each of which lie in a plane at a right angle to the axis 350.

The side portions 342 are connected at their lower end by a connecting portion 374 and at the upper end by an upper connecting portion 376, and the latter two portions are formed integrally with the side portions 342 and 344 as a casting for economy.

As best seen in FIG. 2, a slot 400 extends longitudinally of the frame means 340 between the side portions 342 and 344.

A clamping assembly is generally indicated at 500 in FIGS. 1 and 4 and has as one of its parts a flange 502 which extends away from the axis 350 on all sides beyond the outermost cylindrical surface 508 of the remainder of the rack bar or directing member 70. The flange 502 is annular and extends up from the outer surface 508 on all sides, the flange 502 being attached to the rack bar 70 by welding 510.

That forward side of the flange 502 which faces away from the body member 12 is provided with a recess 516 surrounding its centeral opening 518 which receives an outermost portion of the rack bar 70 as shown at 520, the outermost portion having a lesser diameter than the surface 508 for providing a shoulder 530 against which the flange 502 rests.

The recess 516 makes possible an annular or rather generally circular outermost flat planar surface 538 on the forward side of the flange 502 which is the only part that engages a clamping block 540, which latter has a pressing portion 542 having an annular planar forward surface 544 which engages the surfaces 360 and the side portions 342 and 344, which latter surfaces 360 face rearwardly, or in other words, toward the body member 12.

The clamping block 540 has a central portion 560 which protrudes forwardly from the pressing portion 542. The portion 560 is of lesser dimension between its left and right side surfaces 566 and 568, which latter side surfaces are the ones which are each disposed in a parallel plane in slidable engagement with the inner sides 346 of the side portions 342 and 344.

The clamping block 540 can be called a first or rearward clamping block and a second or forward clamping block is seen at 600 and has an opening extending from forward to rearward therethrough as seen at 510, the rearward surface 512 of the second or forward clamping block 600 is disposed in a plane at a right angle to the axis 350 and parallel to the forward edge surfaces 360 of the side portions 542 and 544 of the frame 340.

The forwardly protruding portion 560 of the clamping block 540 has its forward side 630 a lesser distance from the rearward surface 360 of its pressing portion 542 than the distance between the edges 360 of a respective side portion 342 or 344 of the frame so as to leave a space seen at 634 for a purpose later described.

The rack bar 70 has an open center as seen at 690 which gives the rack bar a greater strength in proportion to its weight and at the forward end of the open center 690 the wall thereof is provided with threads 694 for receiving the threaded rearward end 700 of a locking bolt generally indicated at 704, the latter also having a handle 710 attached to the threaded forward portion 700 thereof, the locking bolt 704 having a forward annular shoulder surrounding the threaded portion 700 and adapted to engage a washer on the rearward side thereof, which latter has upon its rearward side an annular pressing surface 730 surrounding a recess 732 on the forward side of the washer 726.

The pressing surface 730 of the washer 726 presses against the second or forward clamping block 600.

Figure 5:
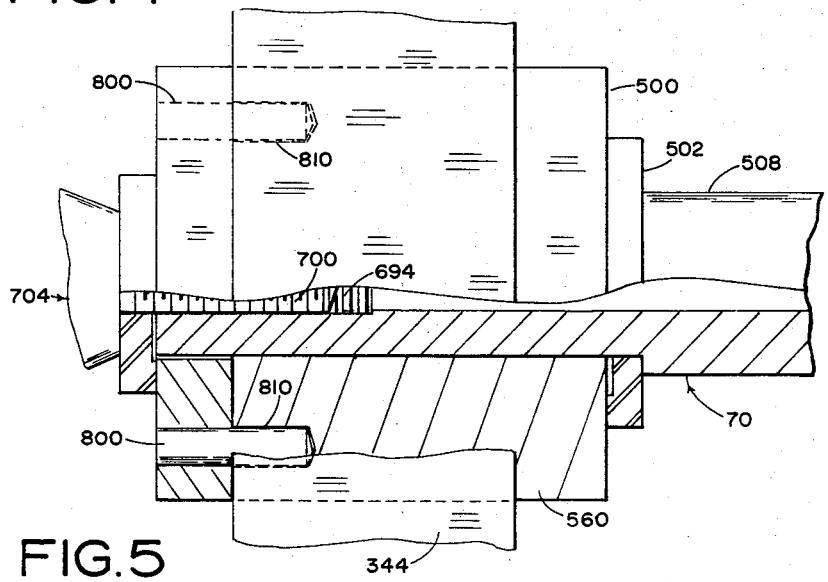
FIG. 5 is a detail of the clamping assembly area of the drill guide shown with a portion thereof removed and the interior shown in section, the view otherwise being a side elevation of the parts shown.

Referring to FIG. 5, it will be seen that a pair of guide pins 800 are attached to the forward clamping block 600 and protrude rearwardly therefrom in parallelism with the axis 350 and are slidably received in snugly fitting recesses 810 of cylindrical shape, the recesses 810 being in the forwardly protruding central portion 560 of the clamping block 540.

We claim:

1. A drill guide comprising a shaft on one end of which a power drill may be attached and on the other of which a drill bit holder is attached, elongated frame means rotatably carrying said shaft for rotation of said shaft about an axis, an elongated forward drilling motion directing member spaced from and extending in parallelism with said shaft, said elongated frame means extending at a right angle to said shaft, means rotatably mounting said shaft in said frame means, and a releasable clamping assembly attaching said frame means to said directing member for the movement of said frame means in a plane at a right angle to said directing member when said clamping assembly is released and for fixing said frame so that said shaft is at a desired angular location with respect to said directing member in said plane when said clamping assembly is clamped, said releasable clamping assembly further attaching said frame means to said directing member in a manner for the movement of said frame so that said shaft moves toward and away from said directing member when said clamping assembly is released and so that when said clamping assembly is clamped said frame is fixed to said directing member so that said shaft is at a fixed distance from said directing member, a body, means mounting said directing member on said body for sliding movements with respect to said body of said directing member longitudinally of itself, said directing member having a longitudinal axis therethrough parallel to said shaft, and means for moving said directing member longitudinally of itself along said axis.

2. The combination of claim 1 in which said releasable clamping assembly comprises a pair of clamping blocks, said frame means having two pressure-receiving surfaces disposed on two opposite sides of at least a portion thereof, a locking bolt, a threaded means threadedly receiving said locking bolt, said frame member being slidable in directions at a right angle to the axis of said directing member at times when said locking bolt is in an unlocked relationship with respect to said threaded means, means holding said threaded means in a fixed position with respect to said directing member, and two elements associated with said locking bolt and with said threaded means respectively and adapted to engage those sides of said clamping blocks which are each disposed on the opposite side of a clamping block from the opposite clamping block, said locking bolt when rotated so as to dispose its threads in a locking position with respect to the threads of said threaded means pressing one of said two elements toward the other whereby said elements press said clamping blocks toward each other and against adjacent opposite surfaces of at least a portion of said frame means for rigidly fixing said clamping blocks with respect to said frame means, one of said elements being fixed to said threaded means whereby the pressure during clamping against said one of said elements tends to fix the position of the respective clamping block with respect to said threaded means and also with respect to said directing member to which latter said threaded means is attached.

3. The combination of claim 1 in which said clamping assembly comprises a pair of clamping blocks having oppositely disposed pressing surfaces, said frame having a portion provided with pressure-receiving surfaces which are disposed in planes parallel to each other and at a right angle to the axis of said directing member, the pressure-receiving surfaces of said frame being disposed between said clamping blocks, a locking bolt having a threaded protruding portion, a threaded means threadedly receiving the protruding portion of said locking bolt, said threaded means being attached to said directing member at a forward end thereof spaced from said body whereby relative movements of said locking bolt with respect to said threaded member are both rotary and longitudinal of said axis in parallelism with said axis, means operatively correlated with said locking bolt and with said directing member so that when said locking bolt is threadedly rotated with respect to said threaded member in one direction said clamping blocks will press against said portion of said frame member for fixing rigidly together said clamping blocks, said frame member, and said directing member.

4. The combination of claim 3 in which said frame member has two spaced side portions having an elongated slot therebetween, the sidewalls of said slot in said frame member extending in parallelism with each other at a right angle to said axis, and in which one of said clamping blocks has a protruding portion extending into said slot between said side portions of said frame, said protruding portion of said one clamping block having a pair of opposite side surfaces which are disposed in planes parallel to each other and parallel to said axis, said protruding portion being freely slidable longitudinally of said frame member in said slot at times when said clamping assembly is not in clamping position.

5. The combination of claim 4 in which the other one of said clamping blocks has guide pin means mounted thereon, said protruding portion of said one of said clamping block having recesses snugly and slidably receiving said guide pin means for maintaining said other one of said clamping blocks in a desired position with respect to said protruding portion and with respect to said one of said clamping blocks.

6. The combination of claim 1 comprising means attached to said body and having bolt opening means therethrough, bolt means in said bolt opening means and extending away from said body for threaded insertion in a work-piece to anchor said body to a work-piece.

References Cited

UNITED STATES PATENTS

| 2,561,914 | 7/1951 | Douglass | 408—114 |
| 1,087,646 | 2/1914 | Detrick | 408—237 |

FRRANCIS S. HUSAR, Primary Examiner

U.S. Cl. X.R.
408—135, 237, 712